United States Patent
Schlitzkus et al.

(10) Patent No.: US 7,237,474 B2
(45) Date of Patent: Jul. 3, 2007

(54) RECIPROCATING PUMP

(75) Inventors: Michael Schlitzkus, Dietmannsried (DE); Andreas Weh, Durach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/551,693

(22) PCT Filed: Mar. 13, 2004

(86) PCT No.: PCT/DE2004/000514

§ 371 (c)(1),
(2), (4) Date: Sep. 30, 2005

(87) PCT Pub. No.: WO2004/088137

PCT Pub. Date: Oct. 14, 2004

(65) Prior Publication Data

US 2006/0198738 A1    Sep. 7, 2006

(30) Foreign Application Priority Data

Apr. 2, 2003   (DE) ................................ 103 14 979

(51) Int. Cl.
   *F04B 53/10*   (2006.01)
   *B60T 8/40*    (2006.01)
(52) U.S. Cl. .......................................... 92/78; 417/569
(58) Field of Classification Search .................. 92/78; 417/312, 541, 569
   See application file for complete search history.

(56) References Cited

U.S. PATENT DOCUMENTS

| 5,123,819 A | * | 6/1992 | Schuller et al. ............. 417/569 |
| 5,199,860 A | * | 4/1993 | Stegmaier .................... 417/569 |
| 5,944,498 A | * | 8/1999 | Wupper et al. ............. 417/569 |
| 6,017,099 A | * | 1/2000 | Schneider et al. ............ 303/87 |
| 6,082,244 A | * | 7/2000 | Siegel et al. .................... 92/78 |
| 6,217,300 B1 | * | 4/2001 | Schuller et al. ................ 92/78 |
| 6,224,352 B1 | * | 5/2001 | Hauser et al. .................. 92/78 |
| 6,283,733 B1 | * | 9/2001 | Merklein et al. ............... 92/78 |
| 6,520,756 B1 | * | 2/2003 | Alaze ......................... 417/441 |

FOREIGN PATENT DOCUMENTS

| DE | 42 42 420 A1 | 6/1994 |
| DE | 199 28 913 A1 | 1/2001 |
| DE | 101 12 618 A1 | 9/2002 |
| DE | 102 29 201 A1 | 1/2003 |
| WO | WO 03/004872 A1 | 1/2003 |

* cited by examiner

*Primary Examiner*—Thomas E. Lazo
(74) *Attorney, Agent, or Firm*—Ronald E. Greigg

(57) ABSTRACT

A piston pump for an electronically controllable vehicle brake system including a particularly simple, inexpensive, and space-saving throttle, and a filter hydraulically upstream of it, which prevents the throttle from becoming clogged with impurities. The pressure fluid outlet is routed at least partway along the circumferential surface of the bushing and, in the region of this section, the filter and throttle are embodied in one piece with the circumferential surface of the bushing.

20 Claims, 2 Drawing Sheets

US 7,237,474 B2

RECIPROCATING PUMP

CROSS-REFERENCE TO RELATED APPLICATIONS

This application is a 35 USC 371 application of PCT/DE 2004/000514 filed on Mar. 13, 2004.

BACKGROUND OF THE INVENTION

1. Field of the Invention

The invention is directed to an improved piston pump of the type used in particular in hydraulic units of hydraulically controllable brake systems in vehicles and is used to produce the required pressure for modulating brake pressures in the different wheel brake cylinders.

2. Description of the Prior Art

A piston pump of the type with which this invention is concerned is already known, for example, from DE 199 28 913 A1 which is comprised, among other things, of a pump housing that contains a pump bore into which a bushing is inserted. The bushing axially guides a pump piston that can be driven into a reciprocating stroke motion. To that end, the piston cooperates with a rotating cam and a return element in the form of a compression spring. This known piston pump is supplied with pressure fluid via a pressure fluid inlet and a pressure fluid outlet, which are respectively connected to inlet and outlet conduits for the pressure fluid in the pump housing. In order to damp pressure pulsations that are generated by the working principle of the piston pump, a throttle is provided in the outlet conduit that drains away the pressure fluid. This outlet conduit is provided on the inside of a sealing piece, which seals the pump bore off from the environment. No filter is provided to protect the throttle from becoming clogged by impurities in the pressure fluid. The outlet conduit extends along the end surface of the bushing and feeds directly into a pressure fluid conduit leading radially away from the piston pump.

Based on this prior art, the object of the invention is to provide a design that makes it possible to inexpensively provide a filter and a throttle while simultaneously not requiring much space, and also offers the possibility of connecting an additional damping element in parallel with the filter in order to further improve the damping properties. This object is attained in an embodiment in which at least part of the pressure fluid outlet is routed along the circumference surface of the bushing and in that in the region of this section routed along the circumference surface, a filter and a throttle are provided, which are of one piece with the bushing.

SUMMARY AND ADVANTAGES OF THE INVENTION

The invention has the advantage over the above-mentioned prior art that the damping action is further improved and that a filter is provided, which prevents a clogging of the throttle with impurities and thus a damage to the piston pump, without appreciably increasing the volume required, the assembly costs, or the component costs. In addition, the design proposed makes it possible for an additional damping volume to be connected in parallel with the filter and in so doing, for the damping element required for this to be aligned perpendicular to the piston pump, in the direction of an electronic control unit to be installed, an alignment that is particularly space-saving and advantageous in terms of possible noise emission.

It is particularly advantageous to provide the filter and the throttle in separate radial ribs spaced axially apart from each other, which extend in the circumferential direction of the bushing. This allows the bushing to be produced in the form of a turned component, an inexpensive, precise method that requires no alteration. It is thus possible to eliminate costly machining steps, e.g. for producing the course of a conduit, which steps are required in the above-cited prior art. The same is true for the production of the filter and throttle in the form of recesses that are open toward the outside and are disposed in the radial ribs. This embodiment is particularly easy to produce from a production engineering standpoint and can also, in terms of functional tolerances, be easily controlled and varied. A particularly effective parallel-connected damping element whose damping housing has an elastomer piece inserted into it provides not only an additional damping volume, but also increases the elasticity in the system and therefore the damping action because the elastomer piece has a lower modulus of elasticity than the pressure fluid. The recess extending in the longitudinal direction in the elastomer piece facilitates its installation on the one hand and on the other hand, increases the area of the elastomer piece that is subjected to the pressure fluid. The latter results in an improvement in the damping properties and in a more uniform load on the elastomer piece.

BRIEF DESCRIPTION OF THE DRAWINGS

An exemplary embodiment of the invention is explained in detail herein below, with reference to the drawings, in which.

DESCRIPTION OF THE PREFERRED EMBODIMENTS

Figure 1:
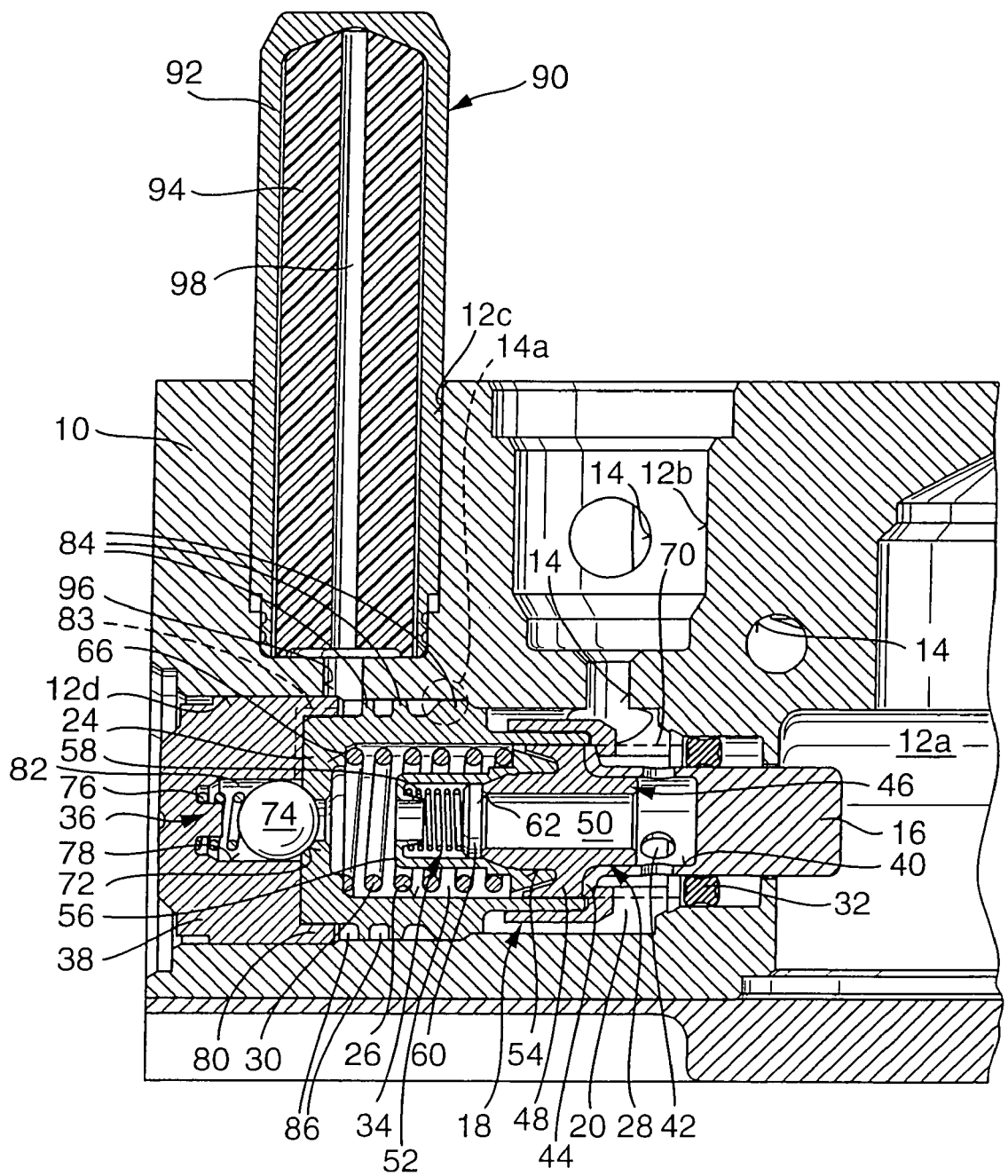
FIG. 1 is a longitudinal section through a piston pump according to the invention, with an additionally attached damping element installed in a pump housing.

FIG. 1 shows a detail of a pump housing 10 with installation spaces 12 (12a-12d) provided in it to accommodate different components, which are not shown here for the sake of clarity, and with pressure fluid-carrying conduits 14 that hydraulically connect these installation spaces 12 to one another. The inner diameters of these installation spaces 12 have multiple steps and are each open toward the outside of the pump housing 10. This design makes it possible to embody the pump housing 10 in the form of a light alloy block that can be inexpensively produced using an extrusion press and to machine this block to produce inlet chambers 12 and conduits 14 by means of a cutting process that requires as few set-ups as possible. The longitudinal axes of the installation spaces 12 and conduits 14 are aligned essentially at right angles to one another for ease of production.

A first installation space labeled 12, with the position number 12a, serves to accommodate a cam, not shown, for actuating a pump piston 16 of a piston pump 18, a second installation space 12b serves to accommodate a solenoid valve, not shown, connected to a pressure fluid inlet 20 of a piston pump 18, a third installation space 12c, together with a press-fitted hollow body that is closed at one end, encloses a damping element 90 that can be optionally provided to damp the pressure pulsations generated by the piston pump 18, and a fourth installation space 12d contains the piston pump 18 itself, which is embodied according to the invention.

This piston pump 18 includes a bushing 24, which has a through opening 26 with multiple steps, a filter element 28 affixed coaxial to this, a pump piston 16 that is guided in a moving fashion and is acted on by a return spring 30, and a total of two spring-loaded valves 34, 36 that control the flow of pressure fluid through the piston pump 18. A sealing ring 32 that rests against the pump piston 16 and the pump housing 10 seals the installation space 12a of the cam in relation to the pressure fluid-carrying regions of the pump housing 10; a sealing cover 38 seals the installation space 12d of the piston pump 18 itself in relation to the outside.

The pump piston 16 is embodied cylindrically and is provided with a blind hole bore 40 at its end oriented toward the bushing 24. Lateral bores 42 feed into this blind hole bore 40 in the region of the inner end and communicate with the pressure fluid inlet 20 of the piston pump 18. The piston end with the blind hole bore 40 widens out toward the outside to form an annular bead 44 whose outer end surface rests against a piston guide element 46.

This piston guide element 46, which is sleeve-shaped and made of elastomer material, protrudes partway into the blind hole bore 40 of the pump piston 16 and has a sealing contour 48 on its circumference, with which the piston guide element 46 rests against the inside of the bushing 24. The sealing contour 48 divides a first pressure fluid chamber 50 from a second pressure fluid chamber 52 of the piston pump 18 and the volumes of the two pressure fluid chambers 50, 52 change based on the stroke motion of the pump piston 16. This volume change occurs reciprocally so that a pumping action causes pressure fluid to flow from the one pressure fluid chamber 50 into the other pressure fluid chamber 52. This causes the two valves 34 and 36 to open and close in alternation.

The above-mentioned sealing contour 48 is essentially comprised of a circumferential, conical, inwardly tapering annular groove 54 on the piston guide element 46, which is open toward the pressure chamber 52. This annular groove 54 engages with a correspondingly shaped wall of a valve cage 56 anchored to the piston guide element 46. This valve cage 56 is hat-shaped and constitutes the first support of an inserted valve spring 58 of the inlet valve 34. A valve plate 60, which is also accommodated in a moving fashion inside the valve cage 56 and is for controlling a valve seat 62 provided at the end of the sleeve-shaped piston guide element 46, constitutes the second support for this valve spring 58 at the opposite end. The valve cage 56 is disposed partially inside the return spring 36 that rests against a shoulder 66 of the bushing 24, which is formed by the stepping of the through opening 26, and against a diametrical expansion at the end of the valve cage 56. In this way, the return spring 30 keeps the pump piston 16 in contact with the circumference surface of the cam, which is not shown in FIG. 1.

The filter element 28, which is preferably produced using injection molding, has a filter screen 70 molded into it. This filter screen 70 removes impurities from the pressure fluid coming from both of the pressure fluid chambers 50, 52 of the piston pump 18. The filter screen 70 covers the inlet-side lateral bores 42 of the pump piston 16.

The second outlet valve 36 that controls the pressure fluid outlet 82 of the piston pump 18 includes a valve seat 72, which is provided at the end of the bushing 24 and is located at the end of the through opening 26 of the bushing 24, a valve closing element 74 in the form of a ball for controlling this valve seat 72, and a valve spring 76 that acts on the valve closing element 74. To that end, the valve spring 76 is supported in a blind hole-like spring recess 78 in the sealing cover 38.

This sealing cover 38 is press-fitted into the installation space 12d of the piston pump 18 and is operationally connected to the bushing 24 by means of an axially extending collar 80. With its end pointing into the interior of the installation space 12d, the sealing cover 38 rests against the end surface of the bushing 24. A groove-shaped recess along this end surface and along the inside of the circumferential collar 80 constitutes an outlet conduit 83, which connects the pressure fluid outlet 82 of the piston pump 18 indirectly to a pressure fluid conduit 14a in the pump housing. Before feeding into the pressure fluid conduit 14a, the pressure fluid consequently flows partway along the circumferential surface of the bushing 24. To achieve this, the outer diameter of the bushing 24 is recessed in relation to the inner diameter of the installation space 12d and is provided with radial ribs 84 extending around its circumference, which are of one piece with it. The circumferential edge of these radial ribs 84 rest against the wall of the installation space 12d and are spaced apart from one another axially in the direction of the longitudinal axis of the piston pump 18. This produces a number of annular chambers 86 disposed one after another in axial sequence.

Figure 2:
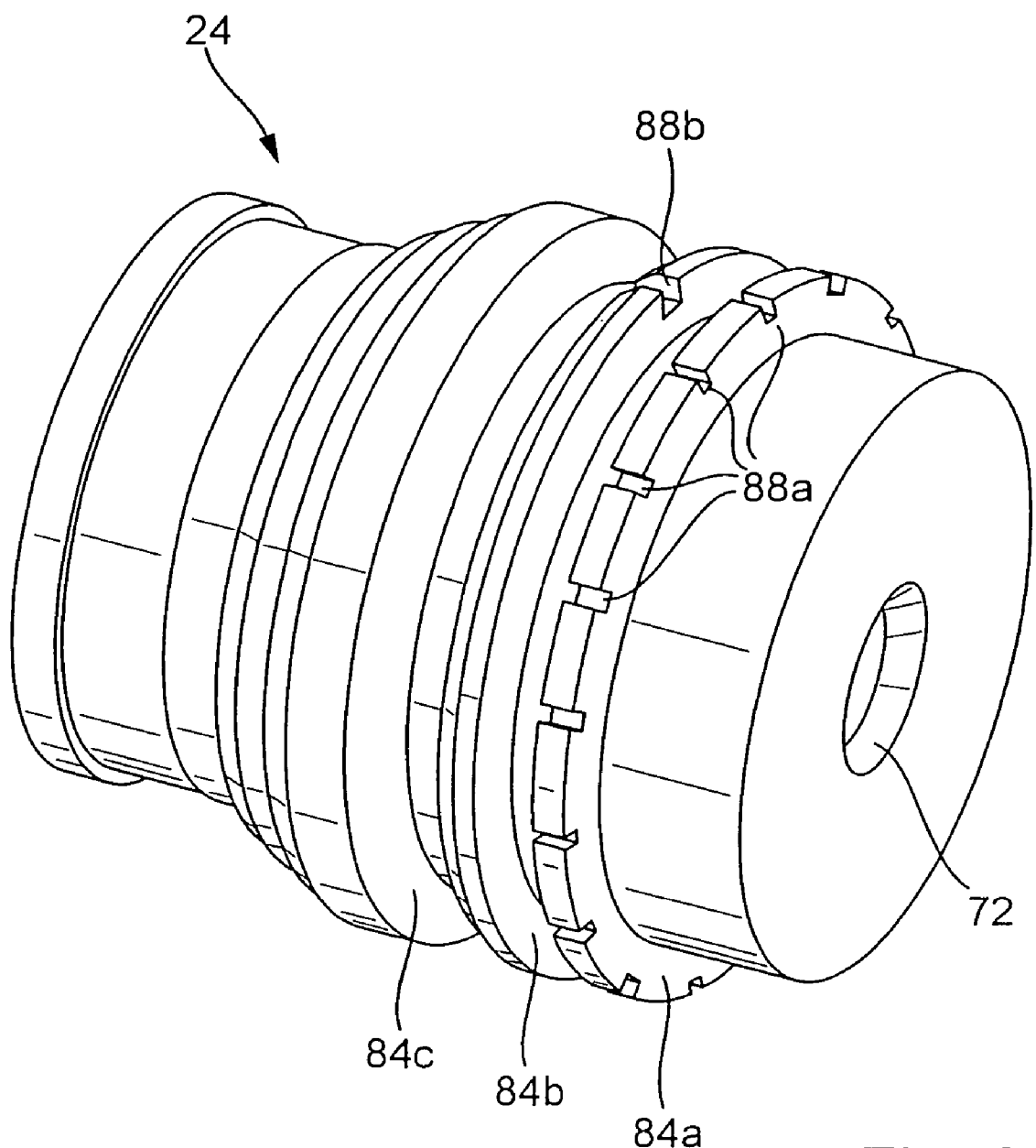
FIG. 2 is a perspective view also showing the bushing of the piston pump, which is depicted as a separate part.

The first radial rib 84a oriented toward the pressure fluid outlet 82 constitutes a filter that is embodied in the form of an edge filter in that it has a number of groove-shaped recesses 88a that are disposed distributed over the circumference of the radial rib 84a (FIG. 2). These recesses 88a are open toward the outside and pass through the radial rib 84a. They therefore permit the passage of pressure fluid from one annular chamber 86a to another 86b, but because of their number and dimensions, retain dirt particles contained in the pressure fluid. The second radial rib 84b disposed after the first radial rib 84a constitutes a throttle, which is similarly embodied in the form of an edge throttle. This throttle is likewise comprised of at least one recess 88b that passes through the associated radial rib 84b and is open toward the circumference side. Its cross section is matched to the cross sections of the filter in such a way that the sum of the individual cross sections of the filter is a multiple of the cross section of the throttle, but each individual cross section is smaller than the cross section of the throttle. Preferably, the recesses 88a of the filter are circumferentially offset from the recesses 88b of the throttle to achieve a particularly favorable damping action by producing a flow diversion. The filter prevents the throttle from becoming clogged with impurities in the pressure medium and thus prevents a pressure increase in the high-pressure region of the piston pump 18 to a level that could cause the sealing cover 38 to be pressed outward and/or could cause a hydraulic overload of the above-described components of the piston pump 18.

The bushing 24 can be produced in a particularly inexpensive fashion in the form of a turned component if the two radial ribs 84a, 84b that constitute the filter and the throttle have the same outer diameter. When installed in the piston pump 18, the radial ribs 84a, 84b, produce a press-fit connection with the wall of the installation space 12d.

A third radial rib 84c disposed after of the throttle rests with its front side oriented toward the pump piston 16 against a step in the installation space 12d and thus seals off the preceding low pressure-carrying pressure fluid inlet 20 of the piston pump 18 from the high pressure-carrying pressure fluid outlet 82 of the piston pump 18 in the region of the filter and the throttle. The pressure fluid-draining conduit 14a in the pump housing begins between the second and third radial ribs 84b, 84c of the bushing 24, i.e. downstream of the throttle.

These damping properties in the exemplary embodiment shown are improved further by providing an attached damping element 90. This damping element 90 is comprised of a hollow body 92 that is open at one end, with an elastomer piece 94 inserted into it. The damping element 90 is aligned essentially perpendicular to the longitudinal axis of the piston pump 18 and protrudes beyond the pump housing 10 on the side to which an electronic control unit for controlling a vehicle brake system can be attached when assembly is complete. The damping element 90 is hydraulically connected to the outlet 82 of the piston pump 18 via a single connecting conduit 96, which connects to the region hydraulically upstream of the filter. The damping element 90 consequently provides a parallel-connected, additional damping volume, without itself having pressure fluid flowing through it.

Part of the hollow body 92 is anchored in the installation space 12c provided. To that end, at the open end of the hollow body 92, the damping element 90 has a contour comprised of circumferential ribs and grooves, which contour displaces the material of the pump housing 10 into the grooves by means of plastic material deformation during the press-fitting process. This produces a pressure-tight positive engagement between the two components without an undesirable production of shavings.

The elastomer piece 4 inserted into the hollow body 92 has continuous longitudinal recesses 98. On the one hand, these recesses or grooves allow the air contained in the hollow body 92 to flow out while the elastomer piece 94 is being installed and on the other hand, they increase the area of the elastomer piece 94 exposed to pressure, thus evening out the pressure strains to which the elastomer piece 94 is subjected. Silicone rubber is particularly suitable as a material for the elastomer piece 94 because of its resistance to the pressure fluid used in vehicle brake systems and because it has a lower modulus of elasticity than the pressure medium. It is therefore possible with a relatively low volume of the damping element 90 to achieve an elasticity of sufficient magnitude for the desired damping properties.

The cooperation of the damping element 90 with the throttle reduces the effects of pressure pulsations in the vehicle interior to a desired degree; the respective damping properties can be adapted to the individual use through dimensioning, shaping, and reciprocal matching of the damping element 90 and the edge throttle. In this regard, it should be noted that it is not absolutely necessary for the throttle provided on the bushing 24 to be coupled with a damping element 90 in order to achieve a damping action.

FIG. 2 shows the bushing 24 once again as an individual part; the reference numerals for corresponding components have been adopted from FIG. 1. In addition to what is shown in FIG. 1, FIG. 2 shows the groove-shaped recesses 88a and b that are let into the radial ribs 84a and b; in the case of the radial rib 84a, these recesses constitute the edge filter and in the case of the radial rib 84b, they constitute the edge throttle. This edge throttle can be comprised of a number of such recesses 88b. Apart from this, FIG. 2 shows the valve seat 72, which is embodied in the form of a conical seat and is part of the outlet valve 36, which, as already mentioned above, is disposed at the end of the bushing 24.

Naturally, modifications or additions to the above-described exemplary embodiment are possible without going beyond the basic concept the invention. This basic concept is essentially viewed as the integration of a filter and throttle into a piston pump 18 in the most cost-neutral and space-neutral way possible.

The foregoing relates to a preferred exemplary embodiment of the invention, it being understood that other variants and embodiments thereof are possible within the spirit and scope of the invention, the latter being defined by the appended claims.

The invention claimed is:

1. A piston pump (18) for a hydraulic unit of an electronically controllable vehicle brake system, comprising
   a pump housing (10) with at least one installation space (12),
   a bushing (24) that is inserted into the installation space (12) and axially guides a pump piston (16) that can be driven into a stroke motion,
   at least one pressure chamber (50) whose volume can be changed by the stroke motion of the pump piston (16),
   a pressure fluid inlet (20) and pressure fluid outlet (82) connected to the pressure chamber,
   the pressure fluid outlet (82) begins at the face end of the bushing and is routed at least partway along a section of the circumferential surface of the bushing (24), and
   a filter and a throttle in the region of the section extending along the circumferential surface, the filter and throttle being of one piece with the bushing (24).

2. The piston pump according to claim 1, wherein the filter is embodied as an edge filter and the throttle is embodied as an edge throttle in that the corresponding radial ribs (84a, 84b) have groove-shaped recesses (88a, 88b) distributed over their circumferences, passing axially through the radial ribs (84a, 84b), and wherein the individual recesses (88a) of the filter have a smaller flow cross section for the pressure medium than the cross section of the throttle, but the sum of flow cross sections of the recesses (88a) of the filter is a multiple of the flow cross section of the throttle.

3. The piston pump according to claim 2, wherein the throttle has a number of recesses (88b) disposed distributed over the circumference of the associated radial rib (84b).

4. The piston pump according to claim 2, wherein the recesses (88a, 88b) of the respective radial ribs (84a, 84b) constituting the filter and the throttle are circumferentially offset from one another in the flow direction.

5. The piston pump according to claim 4, wherein the radial ribs (84a, 84b) produce a press-fit connection with the wall of the installation space (12) and wherein in addition to the radial ribs (84a, 84b) constituting the filter and the throttle, the bushing (24) is provided with at least one third radial rib (84c), which seals off the pressure fluid inlet (20) from the pressure fluid outlet (82).

6. The piston pump according to claim 2, wherein the radial ribs (84a, 84b) produce a press-fit connection with the wall of the installation space (12) and wherein in addition to the radial ribs (84a, 84b) constituting the filter and the throttle, the bushing (24) is provided with at least one third radial rib (84c), which seals off the pressure fluid inlet (20) from the pressure fluid outlet (82).

7. The piston pump according to claim 2, further comprising a damping element (90) hydraulically connected in parallel to the filter, the damping element having a longitudinal axis extending transversely to the longitudinal axis of the piston pump (18).

8. The piston pump according to claim 1, further comprising a damping element (90) hydraulically connected in parallel to the filter, the damping element having a longitudinal axis extending transversely to the longitudinal axis of the piston pump (18).

9. The piston pump according to claim 8, wherein the damping element (90) includes a hollow body (92) that is open at one end and into whose inner chamber an elastomer piece (94) is inserted, which has at least one continuous recess (98) extending in the longitudinal direction.

10. A piston pump (18) for a hydraulic unit of an electronically controllable vehicle brake system, comprising
   a pump housing (10) with at least one installation space (12),
   a bushing (24) that is inserted into the installation space (12) and axially guides a pump piston (16) that can be driven into a stroke motion,
   at least one pressure chamber (50) whose volume can be changed by the stroke motion of the pump piston (16),
   a pressure fluid inlet (20) and pressure fluid outlet (82) connected to the pressure chamber,
   the pressure fluid outlet (82) being routed at least partway along a section of the circumferential surface of the bushing (24), and
   a filter and a throttle in the region of the section extending along the circumferential surface, the filter and throttle being of one piece with the bushing (24), wherein the filter and the throttle are embodied in radial ribs (84*a*, 84*b*), which extend in the circumference direction and are spaced axially apart from each other, and wherein the circumferential edges of these radial ribs (84*a*, 84*b*) produce a pressure fluid-tight connection with the wall of the installation space (12) of the piston pump (18).

11. The piston pump according to claim 10, wherein the bushing (24) has at least two radial ribs (84*a*, 84*b*), and wherein the filter is associated with the upstream first radial rib (84*a*) and the throttle is associated with the downstream second radial rib (84*b*).

12. The piston pump according to claim 10, wherein the throttle has a number of recesses (88*b*) disposed distributed over the circumference of the associated radial rib (84*b*).

13. The piston pump according to claim 12, wherein the recesses (88*a*, 88*b*) of the respective radial ribs (84*a*, 84*b*) constituting the filter and the throttle are circumferentially offset from one another in the flow direction.

14. The piston pump according to claim 10, wherein the radial ribs (84*a*, 84*b*) produce a press-fit connection with the wall of the installation space (12) and wherein in addition to the radial ribs (84*a*, 84*b*) constituting the filter and the throttle, the bushing (24) is provided with at least one third radial rib (84*c*), which seals off the pressure fluid inlet (20) from the pressure fluid outlet (82).

15. The piston pump according to claim 14, wherein the radial ribs (84*a*, 84*b*) of the filter and throttle have the same outer diameter.

16. The piston pump according to claim 14, further comprising a damping element (90) hydraulically connected in parallel to the filter, the damping element having a longitudinal axis extending transversely to the longitudinal axis of the piston pump (18).

17. The piston pump according to claim 10, further comprising a damping element (90) hydraulically connected in parallel to the filter, the damping element having a longitudinal axis extending transversely to the longitudinal axis of the piston pump (18).

18. A piston pump (18) for a hydraulic unit of an electronically controllable vehicle brake system, comprising
   a pump housing (10) with at least one installation space (12),
   a bushing (24) that is inserted into the installation space (12) and axially guides a pump piston (16) that can be driven into a stroke motion,
   at least one pressure chamber (50) whose volume can be changed by the stroke motion of the pump piston (16),
   a pressure fluid inlet (20) and pressure fluid outlet (82) connected to the pressure chamber,
   the pressure fluid outlet (82) being routed at least partway along a section of the circumferential surface of the bushing (24), and
   a filter and a throttle in the region of the section extending along the circumferential surface, the filter and throttle being of one piece with the bushing (24), wherein the bushing (24) has at least two radial ribs (84*a*, 84*b*), and wherein the filter is associated with the upstream first radial rib (84*a*) and the throttle is associated with the downstream second radial rib (84*b*).

19. The piston pump according to claim 18, wherein the throttle has a number of recesses (88*b*) disposed distributed over the circumference of the associated radial rib (84*b*).

20. The piston pump according to claim 19, wherein the recesses (88*a*, 88*b*) of the respective radial ribs (84*a*, 84*b*) constituting the filter and the throttle are circumferentially offset from one another in the flow direction.

* * * * *